United States Patent
Schlittenbauer et al.

(10) Patent No.: US 9,637,083 B2
(45) Date of Patent: May 2, 2017

(54) METHOD FOR OPERATING A SEAT BELT SYSTEM IN A MOTOR VEHICLE AND MOTOR VEHICLE

(71) Applicant: AUDI AG, Ingolstadt (DE)

(72) Inventors: Michael Schlittenbauer, Ingolstadt (DE); Marcus Kuehne, Ingolstadt (DE); Ulrich Mueller, Ingolstadt (DE); Megan McClain, San Francisco, CA (US); Nathaniel Paffett-Lugassy, San Francisco, CA (US)

(73) Assignee: AUDI AG, Ingolstadt (DE)

( * ) Notice: Subject to any disclaimer, the term of this patent is extended or adjusted under 35 U.S.C. 154(b) by 48 days.

(21) Appl. No.: 14/678,394

(22) Filed: Apr. 3, 2015

(65) Prior Publication Data

US 2015/0283974 A1    Oct. 8, 2015

Related U.S. Application Data

(60) Provisional application No. 61/974,735, filed on Apr. 3, 2014.

(51) Int. Cl.
| | |
|---|---|
| *B60R 22/00* | (2006.01) |
| *E05F 15/00* | (2015.01) |
| *G05D 1/00* | (2006.01) |
| *G05D 3/00* | (2006.01) |
| *G06F 7/00* | (2006.01) |
| *G06F 17/00* | (2006.01) |
| *B60R 22/02* | (2006.01) |

(52) U.S. Cl.
CPC ........ *B60R 22/02* (2013.01); *B60R 2022/021* (2013.01)

(58) Field of Classification Search
CPC ...................................................... B60R 22/02
USPC ............................................................ 701/45
See application file for complete search history.

(56) References Cited

U.S. PATENT DOCUMENTS

| | | | |
|---|---|---|---|
| 2005/0283293 A1* | 12/2005 | Durach | B60N 2/0248 701/49 |
| 2007/0195990 A1* | 8/2007 | Levy | B60R 22/48 382/100 |
| 2010/0176581 A1* | 7/2010 | Usoro | B60R 22/03 280/807 |
| 2012/0112503 A1* | 5/2012 | Masutani | B60N 2/42754 297/216.1 |

FOREIGN PATENT DOCUMENTS

| | | |
|---|---|---|
| DE | 10328560 | 1/2005 |
| DE | 102008024332 | 12/2009 |
| DE | 102010004162 | 12/2010 |

* cited by examiner

*Primary Examiner* — Maceeh Anwari
(74) *Attorney, Agent, or Firm* — Staas & Halsey LLP

(57) ABSTRACT

A method operates a seat belt system in a motor vehicle. The method uses a 3-D imaging system to determine when a tongue of the seat belt system is approaching a buckle of the seat belt system. A buckle presenter extends the buckle from a seat of the motor vehicle, toward an occupant of the motor vehicle when the 3-D imaging system determines that the tongue is approaching the buckle.

16 Claims, 3 Drawing Sheets

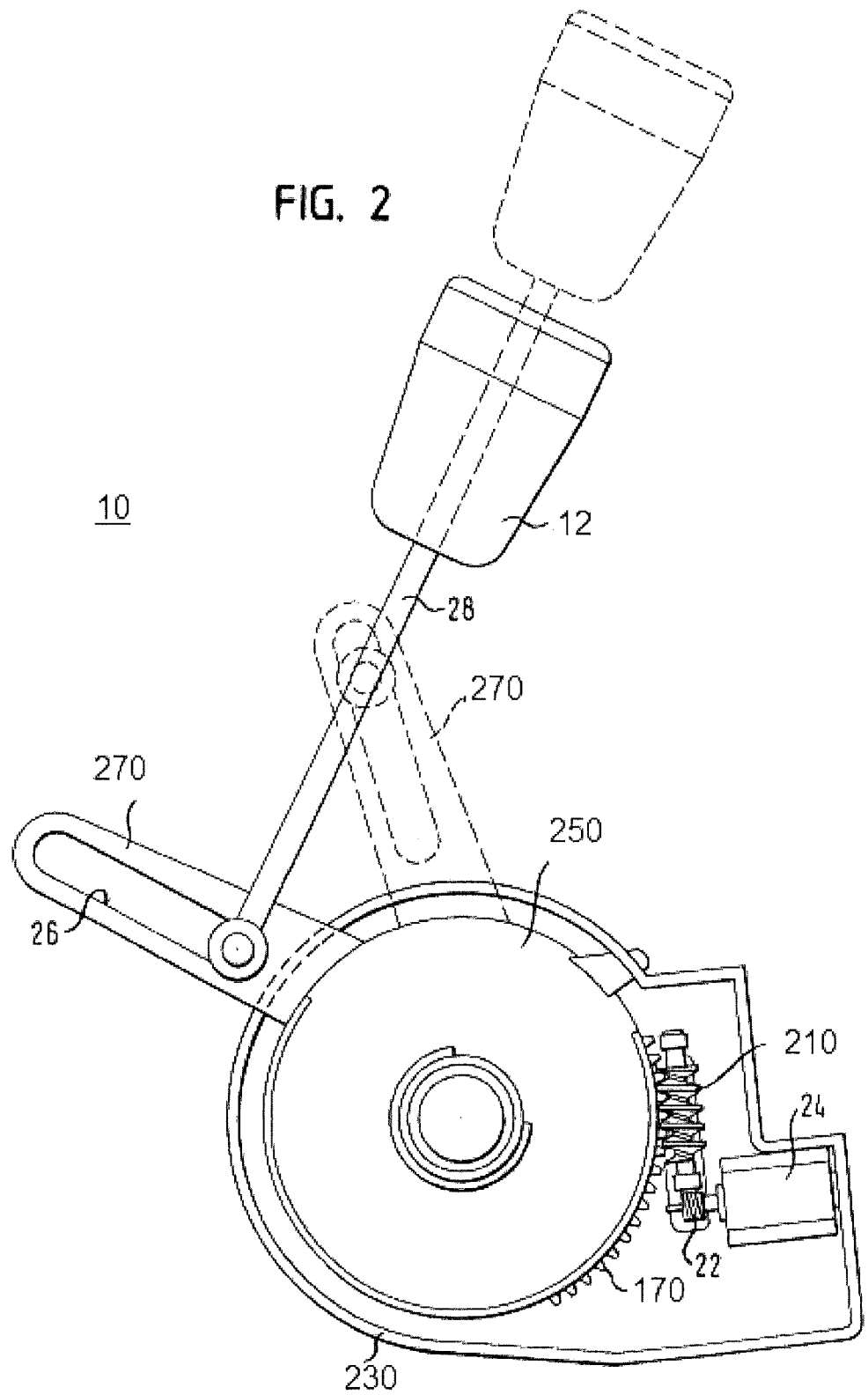

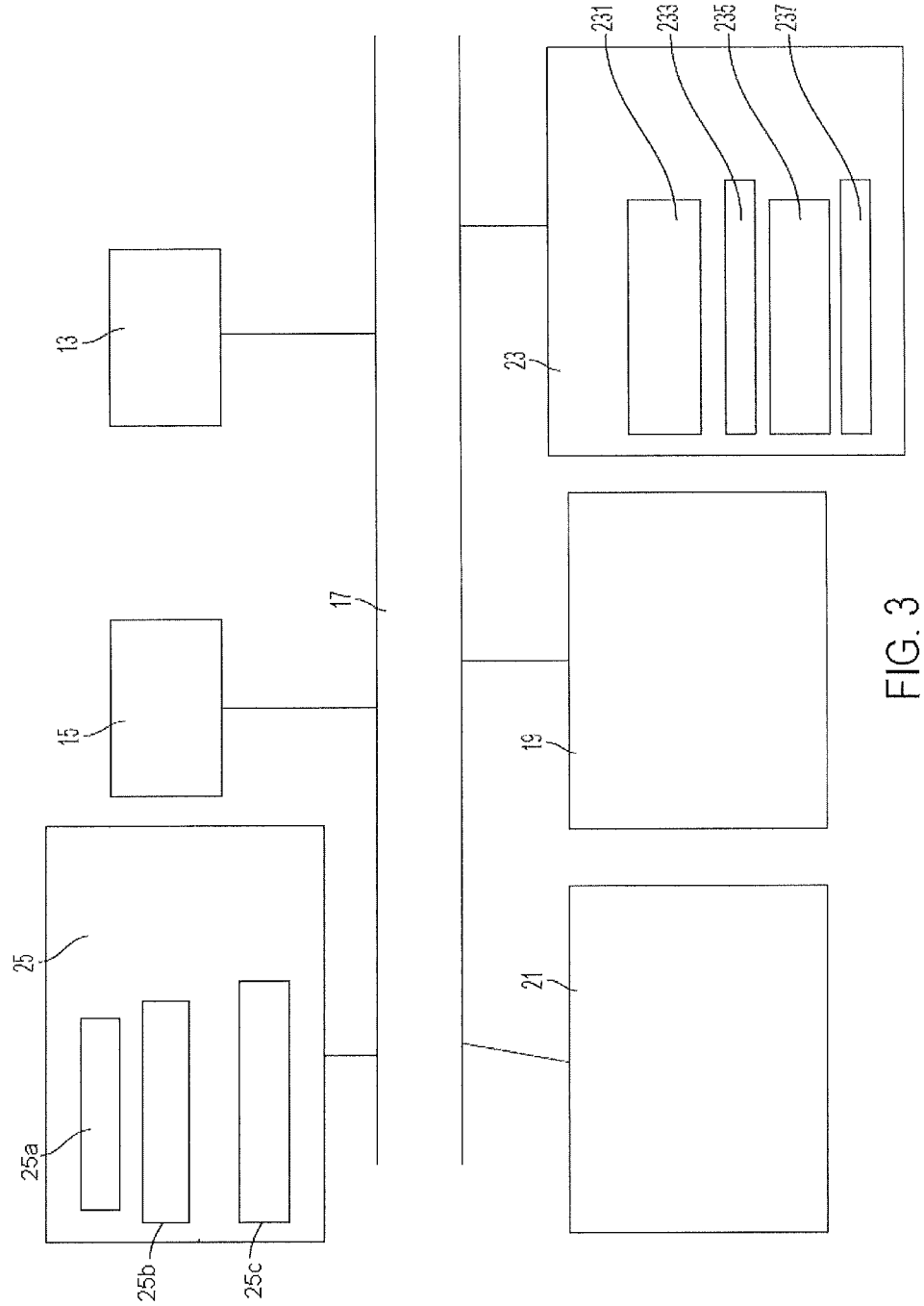

METHOD FOR OPERATING A SEAT BELT SYSTEM IN A MOTOR VEHICLE AND MOTOR VEHICLE

CROSS REFERENCE TO RELATED APPLICATIONS

This application is based on and hereby claims priority to U.S. Provisional Application No. 61/974,735 filed on Apr. 3, 2014, the contents of which are hereby incorporated by reference.

BACKGROUND

The present invention relates to a motor vehicle and a method for operating a seat belt system in a motor vehicle.

A seat belt, also known as a safety belt, is a motor vehicle safety device designed to secure an occupant of the vehicle against harmful movement that may result during a collision or a sudden stop. A seat belt functions to reduce the likelihood of death or serious injury in a traffic collision by reducing the force of secondary impacts with interior strike hazards, by keeping occupants positioned correctly and by preventing ejection of the occupants from the vehicle in a crash or if the vehicle rolls over.

Safety belt systems typically include an insertable structure (or "tongue") configured to mate with a buckle when inserted therein, so as to result in a fastened clasp. The buckle is firmly attached to a structural member of the vehicle seat or the vehicle itself. Conventional buckles are permanently fixed in position. Depending on the manufacturer's design, a conventional buckle is either constantly readily accessible, but always visible, or constantly hidden, but always in a difficult-to-reach position relative to the user.

In response to the afore-mentioned concerns, one proposal has been to use a safety belt buckle presenter to selectively cause the buckle to translate between deployed and stowed positions. Such a buckle presenter is operable to stow the buckle when it is not needed, and to automatically present the buckle when desired. As such, the buckle presenter is useful for aiding physically challenged users (e.g., the disabled, elderly, youth, etc.) to fasten their seat belts, and serves to remind and increase convenience for all users.

In order for the buckle presenter to operate effectively, the buckle must be presented at the proper time, when it is needed. One proposal is to detect when a vehicle occupant has sat in the corresponding vehicle seat. For example, buckle deployment may occur when a piezoelectric-based load sensor detects a force greater than a predetermined minimum, for example greater than 20 pounds. Based on the output of this sensor, it is concluded that the vehicle seat is occupied and the buckle is needed. However, the vehicle seat being occupied does not necessarily mean that the occupant is trying to fasten his/her seat belt.

Another way to control the buckle presenter is to use a sensor in a belt retractor. Modern seat belt systems commonly use a locking belt retractor to provide the seated occupant the convenience of some free movement of the upper torso, while limiting this movement in the event of a crash. The webbing of the seat belt is stowed on a spring-loaded reel within the retractor. This reel is equipped with an inertial locking mechanism that stops the belt from extending off the reel during severe deceleration.

A sensor can be provided on the spring-loaded reel to determine when the occupant is pulling the safety belt webbing toward the buckle. Thus, in addition to occupying the associative passenger seat, the triggering condition for the buckle presenter may be the act of pulling the safety belt webbing. Opening and closing a vehicle door are other possible triggering conditions. These triggering conditions may be more accurate than a seat sensor, but they require expensive sensors.

The buckle may be returned to a normal position either when the tongue is inserted into the clasp or, if the occupant has not fastened the seat belt, after a predetermined time has elapsed. However, these return triggering mechanisms do not fully consider the occupant's actions. Returning the buckle at the wrong time is inconvenient to the vehicle occupant and could even pinch the occupant's hands between the seat and the buckle.

SUMMARY

One potential object is to increase safety and convenience within a motor vehicle, while maintaining costs.

The inventors propose a method for operating a seat belt system in a motor vehicle. According to the proposed method, a 3-D imaging system is used to determine when a tongue of the seat belt system is approaching a buckle of the seat belt system. The inventors propose to extend the buckle from a seat of the motor vehicle, toward an occupant of the motor vehicle when the 3-D imaging system determines that the tongue is approaching the buckle. The buckle is extended from a stowed position to a deployed position. The 3-D imaging system allows the buckle to be presented to increase convenience and safety, at a time more accurately representing when it is needed. The 3-D imaging system may also be more cost-effective than other mechanisms for triggering deployment of the buckle.

In a particularly useful embodiment, the 3-D imaging system determines when the tongue is approaching the buckle without using a sensor in a belt webbing retractor of the seat belt system. If this sensor can be eliminated, costs are reduced.

According to a beneficial option, the buckle is maintained in the deployed position while a hand of the occupant is closely adjacent to the buckle. During this time, the occupant may be trying to fasten the seat belt and will need the more accessible buckle.

Advantageously, the proposed method also detects when the hand is removed from the buckle and retracts the buckle from the deployed position to the stowed position at a time based on when the hand is removed the buckle. Maintaining the buckle in the deployed position after the belt has been fastened is unnecessary and could obstruct the occupant. Therefore, a prompt return is important.

According to one advantageous development, the 3-D imaging system is also used to detect when the hand is removed from the buckle. Conventional sensors are unable to determine when the hand is removed from the buckle. The 3-D imaging system may be able to do this without significantly increasing costs.

A further advantage is achieved if the 3-D imaging system is used to determine that the tongue is clasped in the buckle. Knowing when the tongue is clasped in the buckle might allow the system to more accurately determine when the buckle should be returned to the stowed position. It might be particularly helpful if the 3-D imaging system is able to determine that the tongue is clasped in the buckle without using a separate sensor in the buckle. If the conventional seat belt sensor can be eliminated, there is additional cost savings.

Particularly useful is if the buckle is retracted further, from the stowed position to an emergency position when an imminent collision is detected. Pre-tensioning the belt around the occupant can prevent the occupant from jerking forward in a crash.

In a particularly useful development, a time-of-flight camera is used as the 3-D imaging system. Time-of-flight cameras have proven to be particularly accurate and are already being installed in some motor vehicles.

According to another beneficial option, the buckle is extended for both the driver's seat and the passenger's seat of the motor vehicle. Both occupants can thereby benefit from the increased safety and convenience.

Advantageously, the 3-D imaging system determines when the tongue is approaching the buckle by identifying a hand of the occupant and by detecting that the hand is approaching the buckle while clasping one or more elements of the seat belt system. By timing deployment in this manner, the buckle is presented only when needed.

According to another advantageous development, the buckle is extended to the deployed position when the hand is within a predetermined distance from the buckle, maintained at the deployed position while the hand is within the predetermined distance, and retracted to the stowed position when the hand is moved more than the predetermined distance from the buckle. In this manner, the buckle may be presented only when it is surely needed and retracted when it is not needed. The predetermined distance may be 30 cm, preferably 20 cm and more preferably 10 cm from the buckle. This should provide sufficient time for deployment of the buckle before the hand is ready to clasp the seat belt and also provide sufficient time for the hand to be removed before retracting the buckle.

A further advantage is achieved if, after the seat belt is fastened and the buckle is stowed, the buckle is re-extended from the stowed position to the deployed position when it is determined that a hand of the occupant is again approaching the buckle. This provides the occupant with more convenience also when unfastening the seat belt. It could be useful if, when the tongue is clasped in the buckle, the buckle is not re-extended from the stowed position to the deployed position unless the motor vehicle is parked. Deployment of the buckle while driving can thereby be avoided The inventors also propose a motor vehicle having a seat for an occupant, a seat belt having a tongue and a buckle in which the tongue engages, a 3-D imaging system to determine when the tongue is approaching the buckle, and a buckle presenter to extend the buckle from the seat, toward the occupant when the 3-D imaging system determines that the tongue is approaching the buckle. All statements with regard to the method can be analogously applied to the motor vehicle.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 2 shows schematically shows selected elements of a seat belt system and a buckle presenter for the seat belt system; and FIG. 3 is a block diagram showing input, output and computing devices for the proposed method and device.

DETAILED DESCRIPTION OF THE PREFERRED EMBODIMENT

Figure 1:
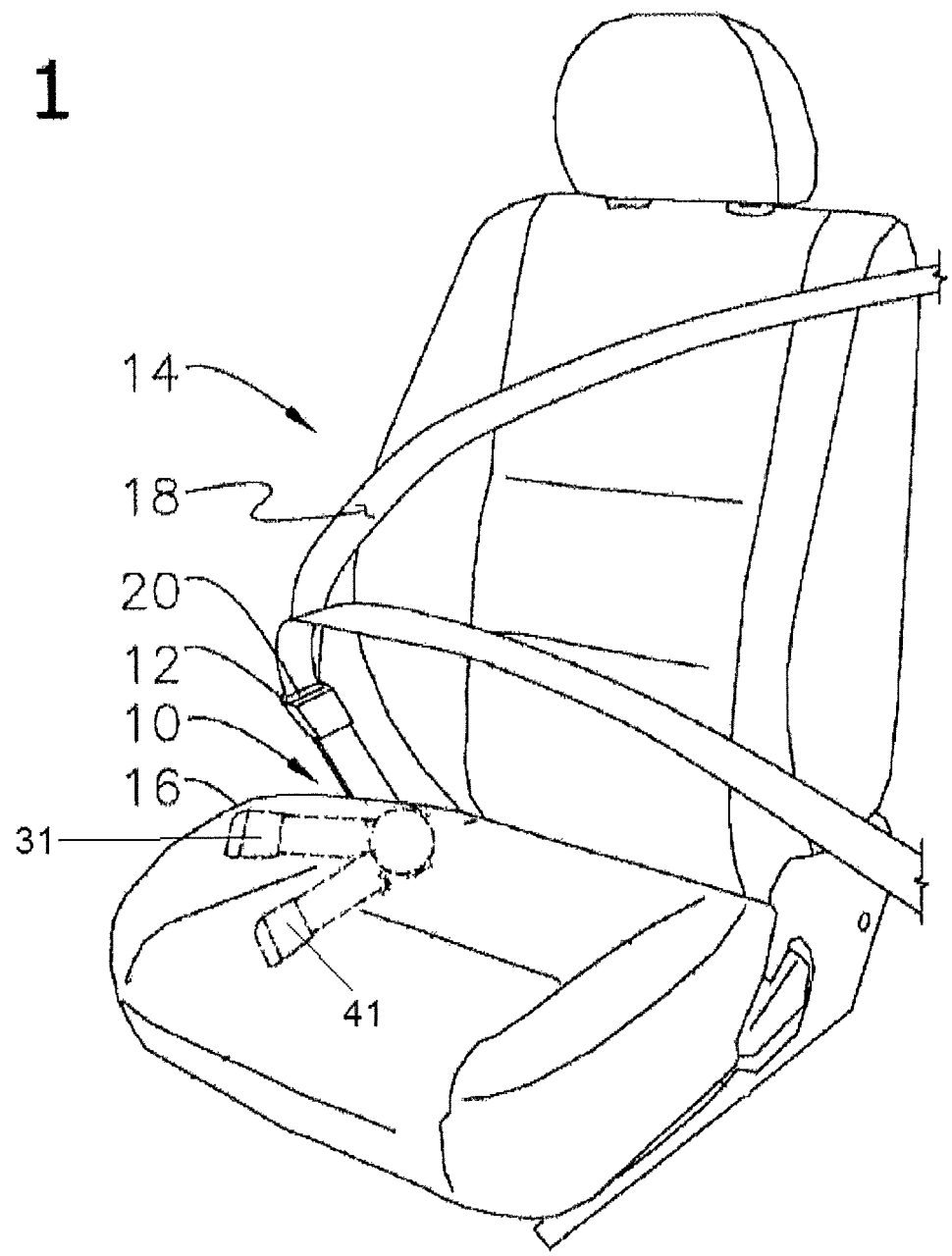
FIG. 1 schematically shows an interior of a motor vehicle.

Reference will now be made in detail to the preferred embodiments of the present invention, examples of which are illustrated in the accompanying drawings, wherein like reference numerals refer to like elements throughout.

FIG. 1 schematically shows the interior of an automobile, which is one example of a motor vehicle. However, the inventors' proposals are not restricted to automobiles or land motor vehicles and may be applied to boats, aircraft and other types of motor vehicle. The vehicle has a safety belt buckle presenter 10 for deploying and stowing a safety belt buckle 12. As shown in FIG. 1, the presenter 10 is adapted for use with a seat belt safety system 14, which includes a safety belt webbing 18, the afore-mentioned buckle 12 and a tongue 20 attached to the webbing 18 and configured to be inserted within the buckle 12, so as to form a clasp. The safety belt system also includes a buckle strap interconnecting the buckle 12 to a fixed structure, such as a frame member of the associated passenger seat 16, the center console or the floor of the vehicle. In the clasped condition, a belt retractor (not shown) acts as a tensioner and causes the webbing 18 to form a surrounding restraint around the occupant (also not shown). Although depicted and described with respect to a passenger seat 16, it is appreciated that the presenter 10 may be used wherever facilitating the use of a safety belt system is desired.

The presenter 10 is coupled to the buckle 12, which is translatably connected to the fixed structure 16, so as to be able to achieve deployed and stowed positions relative thereto. That is to say, the spatial positioning of the buckle 12 can be adjusted without detaching the buckle 12 from the structure 16.

According to various aspects of the invention, when the driver (or passenger) gets in the vehicle and grabs the tongue of the seat belt, the buckle is deployed, making it easier for the driver or passenger to insert the tongue into the buckle and secure the belt. In FIG. 1, the deployed position is shown with solid lines.

After the seat belt is buckled and the hand is removed from the clasp, the buckle is retracted to a normal or stowed position. The stowed position is shown with dashed lines in FIG. 1 and labeled with reference numeral 31. According to one potential embodiment, if the vehicle is about to crash, the buckle is automatically pulled down even further to pretension the belt before the accident. This emergency position of the buckle is shown with dashed lines in FIG. 1 and labeled with reference numeral 41.

The different positions shown in FIG. 1 represent only one possible embodiment for how the buckle can be moved. With the presenter 10, the buckle 12 may be pivotally, flexibly, or slidingly attached, or attached by a collapsing, telescoping, or otherwise reconfigurable apparatus, body, or assembly to the structure 16. As such, there are various different ways the buckle 12 can achieve the deployed, stowed and emergency positions. For example, FIG. 2 shows a rotating variable pulley 250 having teeth 170 driven by a worm gear 210, 22 and a motor 24 provided in a housing 230. A lever 270 has a track 26 in which a pin attached to the buckle slides.

It should be appreciated that various mechanical configurations are possible for moving the buckle 12. In addition to a pure mechanical system, a chemical/mechanical configuration is also possible. For example, a shape memory alloy could be activated using electrical wires to selectively move the buckle 12. Moreover, it is possible that a single mechanism could move the buckle 12 between the deployed, stowed and emergency positions. However, two different mechanisms could be used to transition the buckle 12 between the three positions. For example, a mechanical device could move the buckle between the deployed and stowed positions. Then, a separate device could move the buckle from the stowed position to the emergency position. For example, when rapid deceleration is sensed, a pyrotechnic device could move the buckle to the emergency position with explosive speed.

With regard to moving from the stowed position 31 to the deployed position, the buckle is extended from the seat of the motor vehicle, toward an occupant of the motor vehicle, when a 3-D imaging system determines that the tongue of the seat belt is approaching the buckle. The exact locations of the stowed and deployed positions depend on the particular application. However, to transition from the stowed position to the deployed position, the buckle is moved up, towards the passenger, perhaps 3 to 13 cm, preferably 5 to 11 cm, particularly 7 to 9 cm.

The 3-D imaging system can identify an occupant's hand and can identify the seat belt. The 3-D imaging system can therefore determine when the hand is holding the seat belt. In this manner, the buckle is not sent to the deployed position every time the occupant's hand is moved toward the buckle. Instead, the occupant's hand must be on the seat belt.

As to exactly when the buckle is the deployed, there are various options. One possibility is that as soon as the imaging system determines that the occupant's hand is on the seat belt or the tongue of the seat belt, the buckle is moved to the deployed position. The buckle may be deployed when the hand touches any part of the seat belt. Alternatively, the buckle may be deployed only when the hand touches the tongue of the belt. The condition for deployment assumes that the tongue is not yet clasped in the buckle. This condition is automatically satisfied if the hand is required to be on the tongue, which is only accessible before the seat belt is fastened.

In addition to deploying as soon as the hand touches the seat belt, another option is to delay deployment until they hand (holding the seat belt) starts to move toward the buckle. Yet another option is to delay deployment until the hand (holding the seat belt) is within a predetermined distance from the buckle. For example, the buckle may be deployed when the hand is within 30 cm, preferably 20 cm and more preferably 10 cm from the buckle. Both of these other options ensure that the buckle is not deployed until it is needed to fasten the seat belt.

As to how the 3-D imaging system works with the proposed method and device, the imaging system can recognize the driver and the passenger and what's going on inside the passenger compartment of the motor vehicle. The 3-D imaging system can determine when an occupant is holding the seat belt and more accurately time deployment of the buckle. The 3-D imaging system can also eliminate a costly sensor in the belt retractor.

The 3-D imaging system is not limited to any particular equipment. One example of a 3-D imaging system is a time-of-flight camera, which is a range imaging camera system that resolves distance based on the known speed of light, measuring the time-of-flight of a light signal between the camera and the subject for each point of the image. The time-of-flight camera is a class of scannerless LIDAR, in which the entire scene is captured with each laser or light pulse, as opposed to point-by-point with a laser beam such as in scanning LIDAR systems. A time-of-flight camera is able to determine 3D depth and IR grayscale information. It operates with a number of modulated light transmitters (for example three infrared LEDs) and a camera for sensing the light as it reflects off elements in the field of view. The camera is able to measure the time-of-flight of each pixel, allowing it to capture complete 3D information. PMD Technologies™ is one manufacturer of time-of-flight cameras.

In addition to time-of-flight cameras, there are other ways to accomplish 3-D imaging. For example, radar could be used. Also, a camera could be focused directly in front of the buckle or the data from a plurality of 2-D cameras could be combined to achieve 3-D imaging. An infrared sensor is another example of a device that could be used for 3-D imaging.

After the seat belt has been fastened, the buckle 12 can be returned to the stowed position. In doing so, the buckle 12 is lowered slowly enough to allow the belt retractor to release more belt without locking or causing the belt to further tighten around the occupant. According to one embodiment, the buckle is retracted to the stowed position when the occupant's hand moves outside the predetermined hand-buckle distance used for deployment.

It may also be possible to return the buckle 12 to the stowed position just shortly after the hand releases the buckle. The buckle 12 may be returned to the stowed position when the hand is perhaps 1 to 6 cm from the buckle, preferably 2 to 5 cm and more particularly 3 to 4 cm from the buckle. Therefore, the hand-buckle distance used for retracting the buckle 12 may be less than that hand-buckle distance used for deploying the buckle 12.

As to the triggering condition that causes the buckle 12 to move from the deployed position to the stowed position, it can be concluded that the hand is no longer touching the buckle if it is determined that the seat belt is in the clasped condition and the hand is moved just slightly outside the area of the buckle. Even without knowledge of the belt being secured, the 3-D imaging system can identify the hand, identify the seat belt, and determine when the hand is separated from the seat belt.

The 3-D imaging system can be used to determine when the seat belt is fastened. The 3-D imaging system can make this determination based on disappearance of the tongue into the buckle and removal of the hand from the belt. The 3-D imaging system can therefore replace a latch sensor in the buckle and save money.

It is important to note that a sensor provided on a reel in the belt retractor might be able to determine when the belt is being pulled toward the buckle 12, thereby causing the buckle 12 to be deployed. However, once fastened, the belt is no longer being unreeled. Therefore, a sensor in the belt retractor is unable to determine when the hand has released the buckle 12. With the proposed method and device, the buckle 12 is returned to the stowed position promptly, without the risk of pinching the occupant's fingers. Since the seat belt may provide better protection when the buckle 12 is stowed, a prompt return to the stowed position also increases safety.

Most modern seat belts are released with a push of a button. This is significantly easier for the occupant than fastening the seat belt, which requires the occupant to align the tongue with the buckle and correctly insert the tongue into the buckle. Accordingly, presenting the buckle for unfastening might be less important than presenting the buckle for fastening. However, one embodiment of the proposals moves the buckle to the deployed position before the buckle is unfastened.

To present the buckle 12 for the purpose of allowing the occupant to release the tongue, the buckle 12 is moved back to the deployed position, perhaps only when the car is parked and the engine is off. The buckle might be raised at this time and maintained in the deployed position until it is determined that the tongue has left the buckle 12. For example, the 3-D imaging system can identify that the tongue is again visible and conclude that the belt is no longer buckled. In addition to requiring that the vehicle be parked and the engine be turned off, one embodiment also requires that the occupant's hand be moving toward the buckle or located in the vicinity of the buckle. When the occupant wants to unfasten the seat belt, the occupant is normally not holding the seat belt. Therefore, the 3-D imaging system might make this determination based on the position of the hand alone. To avoid the buckle 12 from oscillating between the deployed and stowed positions, once it is determined that the hand is moving toward or in the vicinity of the buckle with the engine turned off, the buckle 12 might remain deployed until the seat belt is unfastened.

With regard to moving from the stowed position to the emergency position, if a control circuit detects that an accident is imminent, the buckle may be pulled down to pretension the seat belt before the accident. Pretensioners preemptively tighten the belt to prevent the occupant from jerking forward in a crash. In the event of a crash, the pretensioner tightens the belt almost instantaneously. Like an airbag, the pretensioner may be triggered by a sensor in the motor vehicle body.

As described above, the buckle 12 is slowly retracted from the deployed position to the stowed position, thereby allowing more belt webbing to be released. Conversely, the belt must be quickly retracted from the stowed position to the emergency position, so as to cause the retractor to lock (if not already locked from the deceleration) and not release additional belt webbing. In this manner, the belt is tightened further before a crash. If a mechanical device, for example, is used to move the buckle between the three buckle positions, this mechanical device can return the buckle to the stowed (normal) position once it is recognized that the risk situation has passed. Alternatively, pretensioning to the emergency position could be done with a separate mechanism, perhaps using explosively expanding gas to drive a piston that retracts the buckle to the emergency position. In this case, the buckle 12 would normally be returned to the stowed position at the time when the gas expansion mechanism is replaced.

Although the features of the proposals are described separately, the described features, functions, operations, and/or benefits can be freely combined. The word (prefix or suffix article) "a" refers to one or more. The embodiments can be implemented as an apparatus (a machine) that includes hardware for performing the described features, functions, operations, and/or benefits, for example, hardware to execute instructions or software, for example, computing hardware (i.e., computing apparatus), such as (in a non-limiting example) any computer or computer processor that can store, receive, retrieve, process and/or output data and/or communicate (network) with other computers. FIG. 3 is a schematic drawing of possible equipment to implement the proposed features. As illustrated in FIG. 3, the equipment can include a computing controller 15 (CPU) or computing processing system (e.g., one or more processing devices (e.g., chipset(s), including memory 13 or a hardware logic circuitry based computer processor(s) that processes or executes instructions stored in a memory, namely a software/program)), computer readable media 21 (e.g., that stores information objects), a transmission communication interface 19 (wired or wireless data network interface), input devices 23, and/or output devices, which are all coupled (directly or indirectly) to each other, for example, can be in communication with each other through one or more data communication buses 17, such as a CAN bus, FlexRay bus, etc. Examples of input devices include one or more gesture recognition cameras 231, an ignition sensor 233, a gear detection or other parking sensor 235 and a seat buckle engagement sensor 237. Examples of output devices 25 include a display 25a, a belt presentation motor 25b and a pyrotechnic activator 25c. Examples of the non-transitory computer-readable media include a magnetic recording apparatus, an optical disk, a magneto-optical disk, and/or volatile and/or non-volatile semiconductor memory (for example, RAM, ROM).

An apparatus or device refers to a physical machine that performs operations, for example, a computer (physical computing hardware or machinery) that implements or executes instructions, for example, executes instructions by way of software, which is code executed by computing hardware including a programmable chip (chipset, computer processor, electronic component), and/or implements instructions by way of computing hardware (e.g., in circuitry, electronic components in integrated circuits).

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

What is claimed is:

1. A method for operating a seat belt system in a motor vehicle, comprising:
   using a 3-D imaging system to determine when a tongue of the seat belt system is approaching a buckle of the seat belt system; and
   extending the buckle from a seat of the motor vehicle, toward an occupant of the motor vehicle when the 3-D imaging system determines that the tongue is approaching the buckle, wherein
   the 3-D imaging system identifies a hand of the occupant,
   the 3-D imaging system identifies when the hand is clasping one or more elements of the seat belt system, and
   the 3-D imaging system determines when the tongue is approaching the buckle by detecting that the hand of the occupant is approaching the buckle while clasping one or more elements of the seat belt system.

2. The method according to claim 1, wherein
   the buckle is extended to a deployed position,
   the buckle is maintained in the deployed position while a hand of the occupant is on or closely adjacent to the buckle, and
   the method further comprises:
      detecting when the hand is removed from the buckle; and
      retracting the buckle from the deployed position to a stowed position at a time based on when the hand is removed the buckle.

3. The method according to claim 2, wherein the 3-D imaging system is used to detect when the hand is removed from the buckle.

4. The method according to claim 1, further comprising determining that the tongue is clasped in the buckle using the 3-D imaging system.

5. The method according to claim 4, wherein the 3-D imaging system determines that the tongue is clasped in the buckle without using a separate sensor in the buckle.

6. The method according to claim 1, wherein
when the 3-D imaging system determines that the tongue is approaching the buckle, the belt is extended from a stowed position to a deployed position, and
the method further comprises:
retracting the buckle from the stewed position to an emergency position when an imminent collision is detected.

7. The method according to claim 1, wherein the 3-D imaging system comprises a time-of-flight camera.

8. The method according to claim 1, wherein the buckle is extended for both a driver's seat of the motor vehicle and a passenger's seat of the motor vehicle.

9. The method according to claim 1, wherein
the buckle is movable at least between a stowed position and a deployed position,
the buckle is extended to the deployed position when the hand is within a predetermined distance from the buckle,
the buckle is maintained at the deployed position while the hand is within the predetermined distance, and
the buckle is retracted to the stowed position when the hand is moved more than the predetermined distance from the buckle.

10. The method according to claim 9, wherein the predetermined distance is 30 cm from the buckle.

11. The method according to claim 9, wherein the predetermined distance is 20 cm from the buckle.

12. The method according to claim 9, wherein the predetermined distance is 10 cm from the buckle.

13. The method according to claim 1, wherein the 3-D imaging system determines when the tongue is approaching the buckle without using a sensor in a belt webbing retractor of the seat belt system.

14. A method for operating a seat belt system in a motor vehicle, comprising:
using a 3-D imaging system to determine when a tongue of the seat belt system is approaching a buckle of the seat belt system; and
extending the buckle from a seat of the motor vehicle, toward an occupant of the motor vehicle when the 3-D imaging system determines that the tongue is approaching the buckle, wherein
when the 3-D imaging system determines that the tongue is approaching the buckle, the buckle is extended from a stowed position to a deployed position, and
the method further comprises:
retracting the buckle from the deployed position to the stowed position when the tongue is clasped in the buckle; and
re-extending the buckle from the stowed position to the deployed position when the tongue is clasped in the buckle and it is determined that a hand of the occupant is approaching the buckle.

15. The method according to claim 14, wherein
when the tongue is clasped in the buckle, the buckle is not re-extended from the stowed position to the deployed position unless the motor vehicle is parked.

16. A motor vehicle comprising:
a seat for an occupant;
a seat belt having a tongue and a buckle in which the tongue engages;
a 3-D imaging system to determine when the tongue is approaching the buckle; and
a buckle presenter to extend the buckle from the seat, toward the occupant when the 3-D imaging system determines that the tongue is approaching the buckle, wherein
the 3-D imaging system identifies a hand of the occupant,
the 3-D imaging system identifies when the hand is clasping one or more elements of the seat belt, and
the 3-D imaging system determines when the tongue is approaching the buckle by detecting that the hand of the occupant is approaching the buckle while clasping one or more elements of the seat belt.

* * * * *